US006806828B1

United States Patent
Sparrow et al.

(10) Patent No.: US 6,806,828 B1
(45) Date of Patent: Oct. 19, 2004

(54) PASSIVE RANGE AND ANGLE MEASUREMENT SYSTEM AND METHOD

(75) Inventors: Mitchell Joseph Sparrow, Wayne, NJ (US); Joseph Cikalo, Nutley, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/667,734

(22) Filed: Sep. 22, 2003

(51) Int. Cl.$^7$ .............................. G01S 5/02; G01S 3/52
(52) U.S. Cl. .................. 342/418; 342/458; 342/357.05; 342/127
(58) Field of Search ................................ 342/418, 458, 342/357.05, 127

(56) References Cited

U.S. PATENT DOCUMENTS

| 4,354,192 A | * 10/1982 | Kohler ........................ 342/128 |
| 4,704,613 A | 11/1987 | Albanese et al. |
| 6,489,922 B1 | 12/2002 | Lin et al. |

* cited by examiner

Primary Examiner—Theodore M. Blum
(74) Attorney, Agent, or Firm—RatnerPrestia

(57) ABSTRACT

A method determines range from a moving platform to an emitter. The method receives a RF signal from the emitter; counts a number of phase reversals of the received RF signal during a period of time; measures a Doppler frequency during the period of time; and determines the range to the emitter based on both the number of counted phase reversals and the measured Doppler frequency.

20 Claims, 6 Drawing Sheets

PASSIVE RANGE AND ANGLE MEASUREMENT SYSTEM AND METHOD

FIELD OF THE INVENTION

The present invention relates, in general, to a system and method for tracking a target. More particularly, the present invention relates to a method for passively determining range from a moving platform to an emitter, wherein the emitter is the target.

BACKGROUND OF THE INVENTION

Target acquisition and tracking are important functions in the desire for autonomy in system design of a vehicle. Vehicles are often required to sense their environment and track targets that are crucial to their navigation profile. Target state estimation is required to provide or predict an accurate target state from a variety of sensors onboard the vehicles.

A conventional method for producing range to a target with respect to a radio wave (RF) signal is to use an active sensor onboard the vehicle. Typical active sensors are radio or acoustic radar or laser range finder sensors. An active sensor transmits a signal to a target. The signal is then reflected off the target and received by the active sensor. The range to the target is calculated by a processor onboard the vehicle based on the travel time between the active sensor transmitted signal and the target reflected signal.

Passive tracking methods offer significant advantages over active tracking methods. Unlike radar, laser and other active tracking sensors, passive sensors do not emit any kind of energy. They only receive target emitted energy and transform the energy for measurement purposes. This characteristic makes passive tracking methods an ideal technique in reconnaissance and surveillance applications. Passive tracking methods can detect the target and, at the same time, can keep the detecting platform or vehicle hidden from any external detection by the target, as it emits no signals.

In general, however, a passive tracking sensor cannot measure range or distance between the sensor and the target, as it is not based on the echoed-signal principle. The passive sensor, typically, offers only measurement of the target direction with respect to the received RF carrier in space. It is, therefore, very challenging to estimate accurate range information to a target from a passive sensor. The present invention addresses the challenge of estimating accurate range and angle information to a target using only passive sensors onboard a moving vehicle or platform.

SUMMARY OF THE INVENTION

To meet this and other needs, and in view of its purposes, the present invention provides a method of determining range from a moving platform to an emitter. The method includes the steps of: (a) receiving a RF signal from the emitter; (b) counting a number of phase reversals of the received RF signal during a period of time; (c) measuring a Doppler frequency during the period of time; and (d) determining the range to the emitter based on both the number of phase reversals counted in step (b) and the Doppler frequency measured in step (c). Step (b) includes counting the number of phase reversals of the received RF signal during the period of time the moving platform traverses a distance. The method may further include the step of: (e) measuring the distance traversed by the moving platform during the period of time. Step (d) may include determining the range to the emitter based on the number of phase reversals counted in step (b), the Doppler frequency measured in step (c) and the distance measured in step (e). Measuring the distance may include obtaining geographic position data at each end of the distance traversed by the moving platform, using either an inertial navigation system (INS), a Global Positioning System (GPS), or a combination of an INS and GPS.

Another embodiment of the invention provides a method of determining range from a moving platform to an emitter. The method includes the steps of: (a) receiving a RF signal from the emitter during a period of time the moving platform traverses a distance, the distance denoted by b; (b) determining a carrier wavelength, $\lambda$, of the RF signal; (c) counting a number of phase reversals of the received RF signal during the period of time, the number denoted by N; (d) determining a range differential, $\Delta R$, between the moving platform and the emitter during the period of time, in which $\Delta R = N\lambda$; (e) measuring a Doppler frequency, fd, during the period of time; and (f) determining the range to the emitter based on the distance b, the range differential $\Delta R$ and the Doppler frequency fd.

Yet another embodiment of the invention provides an apparatus, installed onboard a moving platform, for determining range from the moving platform to an emitter. The apparatus includes a receiver for receiving a RF signal from the emitter, an analog to digital converter (ADC) for converting the received RF signal into a digital signal, a memory for storing the digital signal provided by the ADC, a processor coupled to the memory for extracting the stored digital signal, and (a) counting a number of phase reversals of the digital signal during a period of time, (b) measuring a Doppler frequency during the period of time, and (c) determining the range to the emitter using both the counted number of phase reversals and the measured Doppler frequency.

The apparatus may also include a GPS receiver coupled to the processor for obtaining geographic position of the moving platform, and the processor determining a distance traversed by the moving platform during the period of time based on the geographic position obtained from the GPS receiver. The apparatus may also include a mixer coupled between the receiver and the ADC for converting the received RF signal into an intermediate frequency (IF) signal, where the ADC converts the IF signal into the digital signal. The mixer may be coupled to a numerically controlled oscillator (NCO) for providing a coherent signal to the mixer, and the mixer may combine the received RF signal and the coherent signal to provide the IF signal.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

One embodiment of the invention includes measuring the range and angular position of a ground based RF signal source, such as a tracking radar, with equipment housed on an aircraft platform. With the availability of high precision ranging signals from Global Positioning System (GPS) and a GPS receiver onboard the aircraft, the invention provides a signal processing technique to measure the angle and range of a pulsed-doppler/continuous wave (CW) radar. The technique advantageously increases the aircraft's probability to complete its assigned mission and enhances its survivability against the ground based radar, when that radar constitutes a threat. The radar position or range is determined passively by measuring the radar signal parameters with all equipment located aboard the aircraft.

As will be explained, the method includes a step performed by a surveillance receiver, namely, intercepting signals from a target tracking radar (TTR) and storing the signals in a digital memory. The stored signals are processed to extract sample to sample variations of various parameter values. These measured (estimated) changes of parameter values are inserted into a set of equations based on geometric properties of two joined triangles with a common base. The geometric properties of the triangle, including sides and angles, are derived from the flight history of the aircraft and the variations of the received signal parameter values.

The method determines the length of one side of the triangle, formed by the aircraft's flight path, by using a GPS receiver that is, generally, installed in the aircraft to compute the geolocation of the aircraft. In the method, the GPS receiver measures the distance flown by the aircraft between two geologically located points. During the flight time, for example, from point A to point B, the method, as will be explained, records the number of RF signal phase reversals and the Doppler frequency. The recorded number of the phase reversal determines the change in the radar range ($\Delta R$) during the time taken by the aircraft to fly the distance (b) between end points A and B.

As will also be explained, the invention uses the signal Doppler frequency. To measure the Doppler frequency of a radar emitted signal, the invention includes a RF signal receiver, a digital signal storage (e.g. digital RF memory (DRFM)) and a digital processor. An ultra stable local oscillator (LO) such as a numerically controlled oscillator (NCO)) is utilized for the down frequency translation process.

It will be appreciated that there is a high stability requirement on the LO, because the observation time is very long. The observation time may be as short as 1 second, or as long as 20 seconds. The longer observation time provides a longer range differential and a greater accuracy of the measured Doppler frequency.

Figure 1:
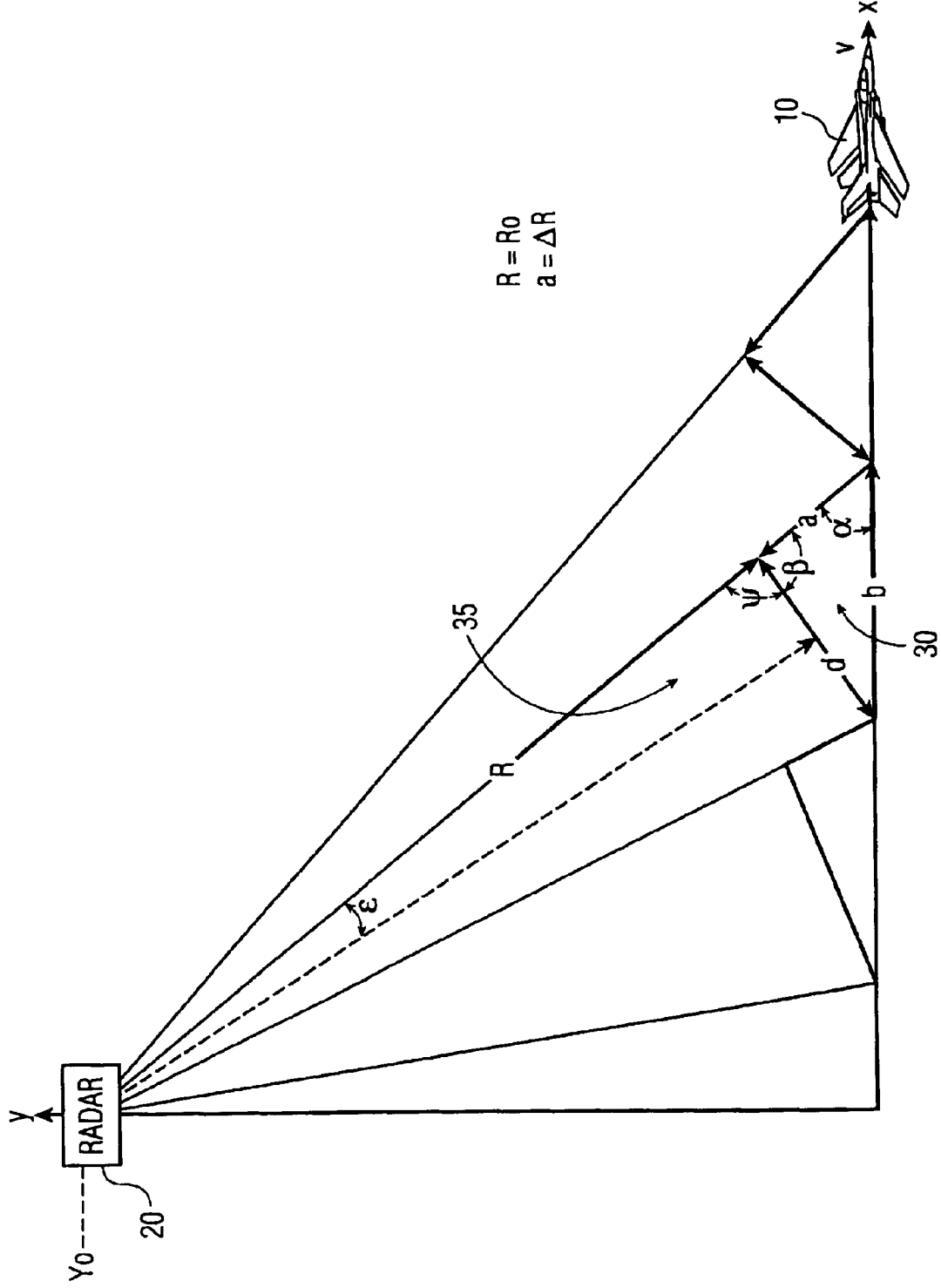
FIG. 1 is a diagram illustrating a geometric relationship between a stationary ground radar and a moving aircraft in accordance with an embodiment of the invention.

An embodiment of the method of the invention will now be described by reference to FIGS. 1–3. As shown in FIG. 1, moving platform 10, which may be an aircraft, is moving at velocity v, at an unknown range from stationary radar 20. The radar is emitting a RF signal. In the example shown in FIG. 1, aircraft 10 is flying a straight line course at a constant velocity and altitude. Locations of aircraft 10 and radar 20 are defined in a tilted x-y plane with a reference x-axis attached to the aircraft. The radar is located at $y=y_0$ distance from the x-axis, coincident with the line flown by the aircraft. The range between the radar and the aircraft, as a function of time, may be defined as:

$$r(t)=[y_0^2+(v^*t)^2]^{1/2}$$

is where v is the velocity of the aircraft, and t is a time variable.

The method of the invention to locate the radar may be initiated at an arbitrary time. For convenience, the time variable t is set to 0. At t=0, the radar signal received at the receiver antenna (FIG. 4) is translated down in frequency to a convenient intermediate frequency (IF). The aircraft velocity includes a component parallel to the radar antenna beam axis (shown as a component in a direction R). The range R changes, and causes RF phase shifts in the received signal. By tracking the RF phase and counting the number of times the phase goes through 0 in T seconds, the change in range (shown as a) is obtained based on the number of phase states $N2\pi$. As the radar RF carrier is known (for example, through electronic intelligence (ELINT)), the range differential becomes $\Delta R=N\lambda$. Assuming that the range at t=0 is Ro, then at t=T, the range increases to Ro+$\Delta R$.

The manner in which Ro is calculated will now be described. In the time duration T, the aircraft moves a distance b=v*T meters. At the end of the observation period T, the length of two (2) line segments, shown as vectors a and b in FIG. 1, may be determined. The b vector has the same direction as v. A direction is needed for the a segment, or $\Delta R$ segment. The angle $\alpha$ where $\Delta R$ intersects b, may be found based on the received signal Doppler frequency. After determining $\alpha$, the third side (d) may be calculated based on the law of cosines formula (side, angle, side). The d side may then be used as a baseline for construction of an equilateral triangle with two long legs Ro. The equilateral triangle, not to scale, is shown in FIG. 1. The equilateral triangle is generally designated as 35, and the small triangle is generally designated as 30.

Figure 2:
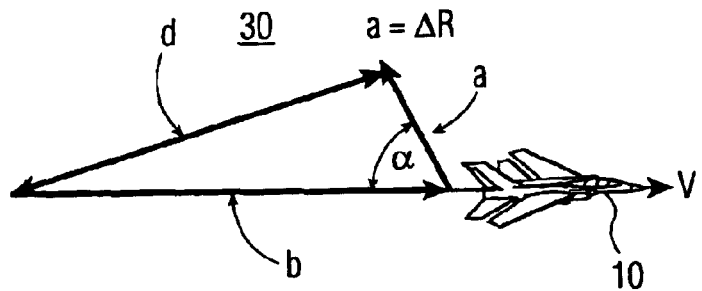
FIG. 2 is a diagram of the small triangle shown in FIG. 1 forming three sides of a, b and d, constructed in accordance with an embodiment of the invention.
Figure 3:
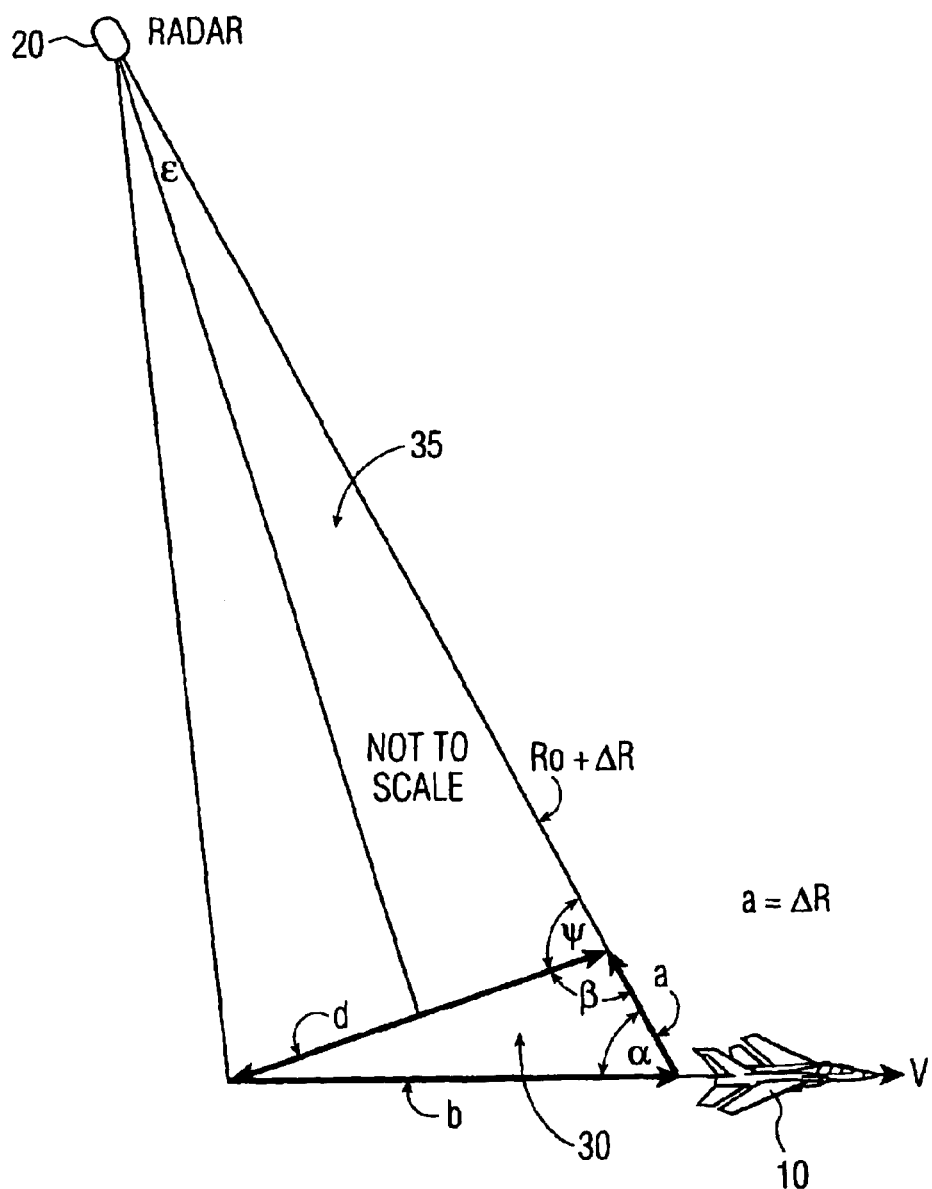
FIG. 3 is a diagram of the equilateral triangle shown in FIG. 1 forming the two equal sides of Ro, constructed in accordance with an embodiment of the invention.

Referring next to FIGS. 2 and 3, there is shown small triangle 30 in FIG. 2 and equilateral triangle 35 in FIG. 3. The construction of small triangle 30 begins with the measurements of b and $\Delta R$. To find the direction of $\Delta R$ an angle is needed. The angle formed by lines b and $\Delta R$ (a=$\Delta R$) is found from measurements of the Doppler frequency of the intercepted radar signal. The Doppler frequency is defined as:

$$f_d=2v^*f_c/c$$

where v is the aircraft velocity, $f_c$ is the radar RF frequency carrier, and c is the speed of light. Since the Doppler frequency of the radar signal, measured by the receiver aboard the aircraft, is imprinted with one way changes in range, the Doppler frequency may be redefined as follows:

$$f_d=\text{range-rate}^*f_c/c$$

The range rate is obtained by differentiation of the range r(t) expression. The analytical expression for the range rate is as follows:

$$dr(t)/dt = v^2 * t / r(t)$$

The Doppler frequency measured aboard the aircraft is not constant, so and varies with time. Incorporating the geometric relationship into the expression of the Doppler frequency, provides the following:

$$f_d = v * \cos(\alpha) * f_c / c$$

This validates the method of the invention for determining the angular position of the radar from measurements of the signal Doppler frequency. Solving for $\alpha$ the following expression is obtained:

$$\alpha = A \cos(f_d * c / f_c * v)$$

where A cos is arc-cosine.

In this manner, the angular position of the source of the RF signal (radar) is found. With the angle $\alpha$ known, the length of the third leg of the small triangle bounded by b and a may also be calculated. By applying the law of cosines formula, the third side may be found, as follows:

$$d = (a^2 + b^2 - 2a*b*\cos(\alpha))^{0.5}$$

The completed triangle is shown in FIG. 3. With the known lengths of the three sides of the triangle, the angle ($\beta$) between the d and a sides may be calculated as follows:

$$\beta = A \cos[(a^2 + d^2 - b^2)2*d*a]$$

where A cos is arc-cosine.

The long legs of equilateral triangle 35 may be found next. As shown in FIG. 3, the angle between the base d and the long side Ro is $\psi = \pi - \beta$. To simplify the computation of the range R, base d of the equilateral triangle may be divided into two halfs and a dividing line (shown as a dashed line in FIG. 1) may be drawn from the center of base d to the apex of the triangle, at the location of the radar. The dividing line forms two right triangles, with Ro as the hypothenuse.

Finally, the method computes the range, as follows:

$$Ro = d/2 \sin(\epsilon), \text{ and}$$

$$R = d/2 * \sin(\epsilon) + \Delta R$$

where $\epsilon$ is the angle of the right triangle at the radar end.

A numerical example using the above described method will now be provided. Assume that an aircraft is flying a straight and level course at a velocity of 200 meters per second and a radar is located at a cross range of 50 km ($y_0 = 50$ km). The radar employs coherent signal processing techniques, operates at a frequency carrier of 10 GHz, and has sufficient RF signal power, so that the aircraft receiver may detect it. An observation time (T) is set to 20 seconds.

Twenty second observation time implies that side b is 4000 meters long. During the observation time of 20 seconds, 35933($2\pi$) phase states are recorded. At 10 GHz frequency, the wavelength is 0.03 m., and the range differential ($\Delta R$) is 1,078 m. (a=1,078 m.). The range differential is a vector with magnitude $\Delta R$ and has a direction to be determined.

The direction of the range differential is derived from the one-way Doppler frequency. As produced by a computer model, the Doppler frequency is 2032 Hz. Dividing the 2032 Doppler frequency by the product of the radar signal carrier frequency and the aircraft velocity ($v*f_c$), and then multiplying the result by the speed of light (c), the angle $\alpha$ is found to be 72.255 degrees. It is calculated by $\alpha = A \cos(2032*3*10^8/200*10^{10})$.

The radar's angular position (line of sight, LOS) is 72.255 degrees with respect to a line parallel with the aircraft velocity vector. With the calculation of this angle, the direction of the range differential (length) is also found. With the two vectors known, the magnitude of the third side (d) is calculated using the law of cosines formula, as follows:

$$d = [16 + 1.162 - 2*4*1.078*\cos(72.254)]^{0.5} = 3.812 \text{ km}.$$

To construct the equilateral triangle on base d, the angle between a and d is computed, using the law of cosines formula, as follows:

$$\beta = A \cos[(14.531 + 1.162 - 16)/2*3.812*1.079] = 92.1245 \text{ degrees}.$$

The two equal angles of the equilateral triangle are $\psi = \pi - \beta$, $\psi = 87.8755$ degrees. From the mid point of base d, a fine normal to the base is drawn, forming two right triangles, as shown in FIG. 3. The second angle of the triangle is $\epsilon = \pi/2 - \psi$, where $\epsilon = 2.1245$ degrees. The length of the hypothenus is $Ro = d/2 \sin(\epsilon) = 51.282$ km. Finally, the range $R = Ro + \Delta R$ may be found, resulting in $R = 51.415 + 1.078 = 52.493$ km.

The invention may be used, for example, in military type airborne platforms, such as tactical aircraft (fighter, reconnaissance), UAV, helicopters, etc. It will be appreciated that the method of the invention may be implemented using conventional design receivers, for example, advanced technology early warning (ATEW) receivers that are installed aboard many military airborne platforms.

It will be understood that the invention may measure range and angle of pulsed Doppler/continuous wave (PD/CW) radars only. This class of target tracking radars employs coherent signals, which the ATEW receiver, for example, may accurately measure with the signal parameter values needed. Two parameter values that the invention requires are range differential and signal Doppler frequency. Unless the received signal is phase coherent, these two parameters cannot be measured.

Figure 4:
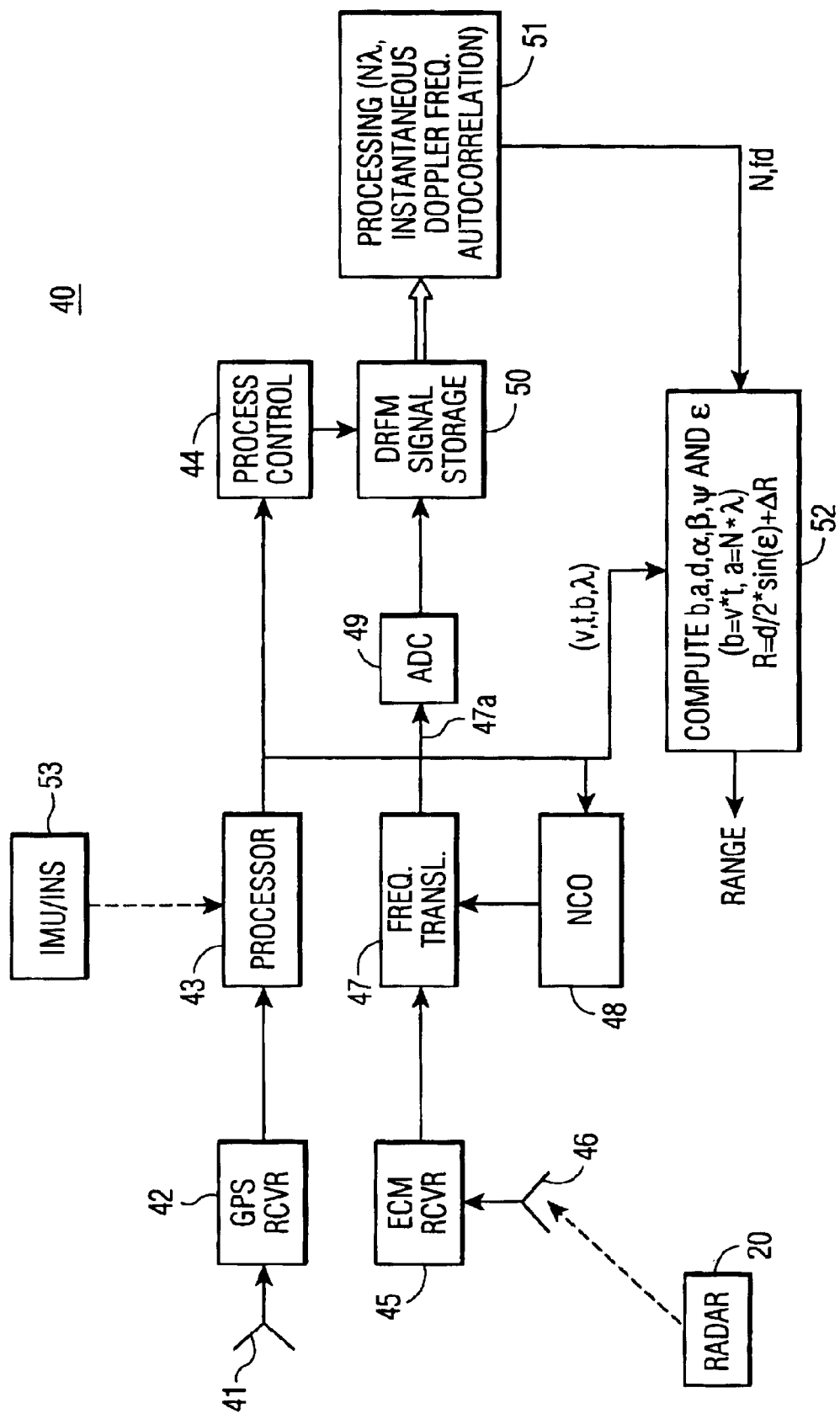
FIG. 4 is a block diagram of the system or apparatus of the present invention, in accordance with an embodiment of the invention.

Referring next to FIG. 4, there is shown an embodiment of a system for determining range to radar 20, the system generally designated as 40. As shown, system 40 includes GPS receiver 42 coupled between GPS antenna 41 and processor 43. Also included are electronic counter-measures (ECM) receiver 45 coupled between ECM antenna 46 and frequency translator, or mixer 47. Mixer 47 combines the radar RF signal from ECM receiver 45 with an oscillation signal from NCO 48 to produce an intermediate frequency (IF) signal on line 47a.

The IF signal on line 47a is provided to analog-to-digital converter (ADC) 49 to produce a digital IF signal, which is stored in digital RF memory (DRFM) 50 and controlled by process controller 44. Processor 51 receives the stored digital IF signal and computes N and the Doppler frequency. The Doppler frequency is computed using an autocorrelator, as described below. Processor 52 computes the three sides of the small triangle (b, a and d) and the length (Ro) of the two sides of the equilateral triangle to determine the range R to the radar.

It will be appreciated that system 40 is installed onboard aircraft 10. Although shown in FIG. 4 as three separate processors, it will also be appreciated that processors 43, 51 and 52 may be a single processor.

As an option, processor 43 may receive navigation data from inertial measuring unit (IMU)/inertial navigation system (INS) 53. The navigation data provided by IMU/INS 53 may be optimally integrated with the navigation data provided by GPS receiver 42.

Still referring to FIG. 4, during the observation time, T, system 40 may measure the number of RF cycles of radar 20, the ground distance flown by the aircraft (VT), and the signal Doppler frequency (fd). In the embodiment shown in FIG. 4, the radar signals intercepted by onboard receiver 45 are first down converted to an IF signal, digitized and stored in memory 50. After accumulation of signals over time T, the data are read out from the digital storage and processed by processor 51 to extract the number of cycles (N) that the signal has changed, due to range contraction or expansion, and the radar signal one-way Doppler frequency. The extraction process performed by processor 51 is further discussed below.

One of the difficulties, in the radar location method of the invention, is the variable nature of the Doppler frequency and its phase instability. Changes in aircraft-radar geometry, causes progressive changes in the signal parameter values.

An important parameter that processor 51 is calculating depends on the microscopic changes between zero crossings of the received radar signal. To quantify these changes, a brief analytical review of the signal is presented below.

A radar transmitted signal waveform is of the form $Vt(t)=\cos(2\pi f_c t)$. The signal waveform is received by the aircraft receiver. The range between radar and aircraft 10 is expressed as $R(t)=Ro+Rr(t)*t$, where $Rr(t)$ is the range rate. The signal waveform received at the aircraft receiver, referenced to the phase of a stable local oscillator, is defined as follows:

$$Vr(t)=\cos\{t[2\pi f_c - Rr(t)2\pi f_c/c] - Ro2\pi f_c/c\}$$

where the first term is the Doppler frequency, and the second term is phase, $f_c/c = 1/\lambda$ and $\Phi = Ro2\pi/\lambda$.

As the range length expands, the phase of the received signal is varied. The phase represents the number of equivalent wavelengths to the range Ro, and it is a large number. Thus, the phase change is substantially equivalent to a distance and may be extracted by saturating the intercepted signal amplitude and counting the number of zero crossings. By detecting the intercepted radar signal and mixing it with a locally generated reference, the radar signal, as intercepted, may be determined.

Extracting the signal Doppler frequency is more complex. The Doppler frequency under most operational conditions varies with time. If the aircraft flies a straight path, the Doppler frequency during short time segments varies linearly up or down. At the closest range, there is reversal of direction, from positive to negative. As one option, the Doppler frequency variation may be determined by taking a short segment of the signal, close to the end of T, counting the number of zero crossings and determining its average. The averaged Doppler frequency may be used in the computation of the angle $\alpha$.

As another option, the signal autocorrelation function may be computed. The width of the main lobe of the autocorrelation function quantifies the Doppler frequency signal bandwidth. This option is useful when the observation time is long (in seconds) and the Doppler bandwidth is in kiloHertz.

To extract the desired radar signal parameters, a locally generated signal frequency is used. The incoming signal is translated down to a practical IF, digitized and stored in a memory, such as a DRFM. After a predetermined size memory is filled, the string of data is extracted and autocorrelation is performed. The width of the main lobe computed autocorrelation function is proportional to the inverse of the time span between the 3 dB points. These signal properties are illustrated in FIGS. 5–8 and discussed below.

Figure 5:
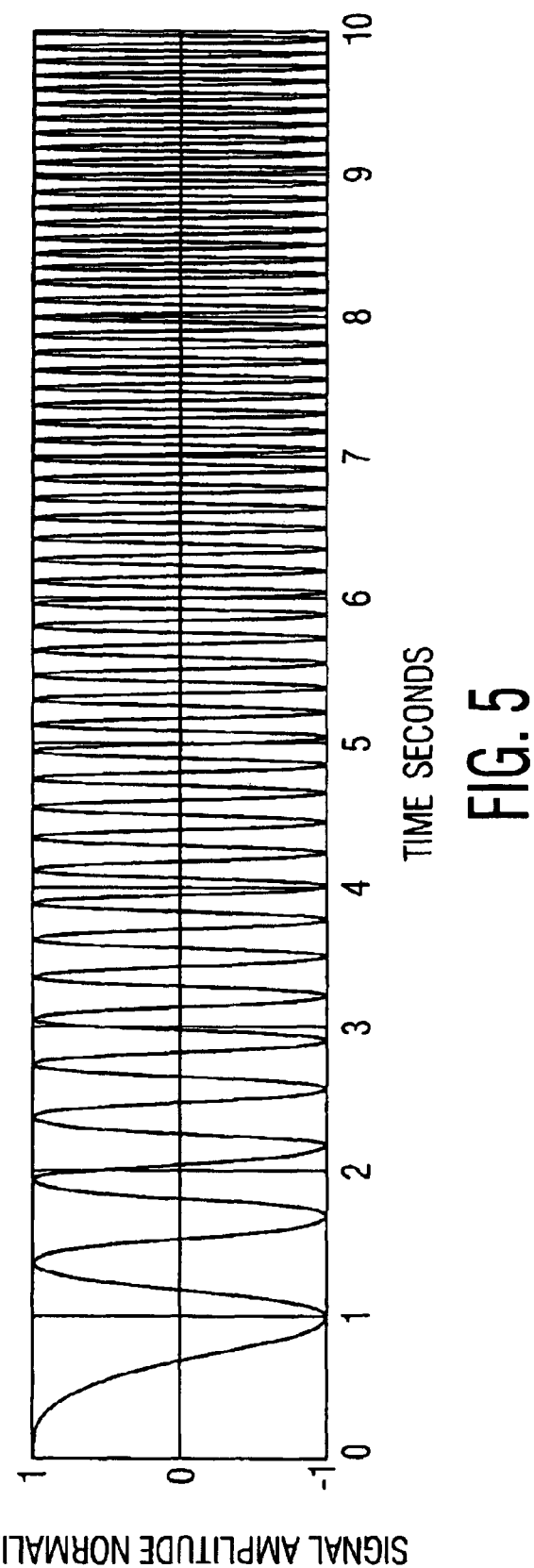
FIG. 5 is a graphical representation of the received radar signal as a function of time, in accordance with an embodiment of the invention.

Assuming that the DRFM output signal is time compressed (eliminating long empty memory locations), the reconstructed output signal resembles a chirp signal (linear frequency modulated time waveform). The analog form of this output signal is shown in FIG. 5, as generated by a computer model. For simplicity, the observation time begins at the closest range to the radar. The signal Doppler frequency starts at zero (plus IF). At 50 km range and 200 mps aircraft velocity, the Doppler frequency varies from 0 to 266 Hz in 10 seconds time interval. The output signal frequency is divided by 10 and graphically shown in FIG. 5.

Figure 6:
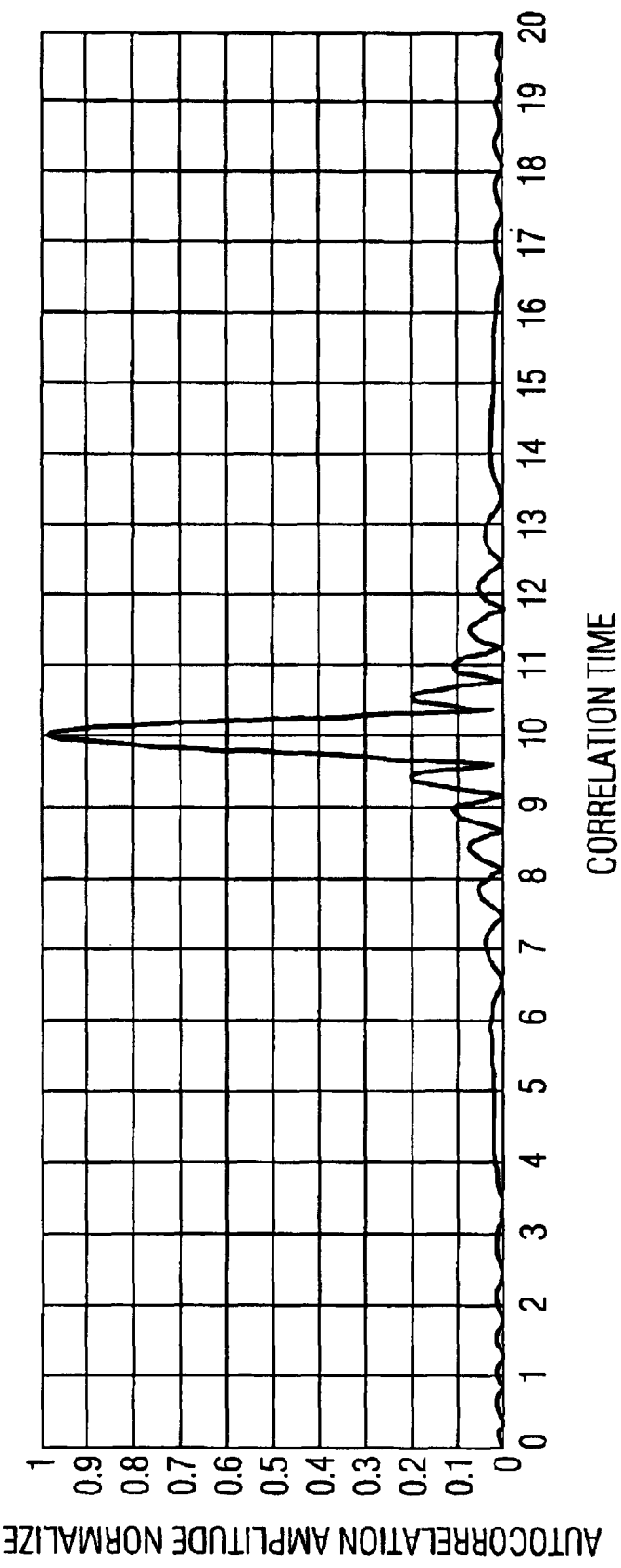
FIG. 6 is a graphical representation of the autocorrelation amplitude for the received radar signal, shown in FIG. 5, in accordance with an embodiment of the invention.
Figure 7:
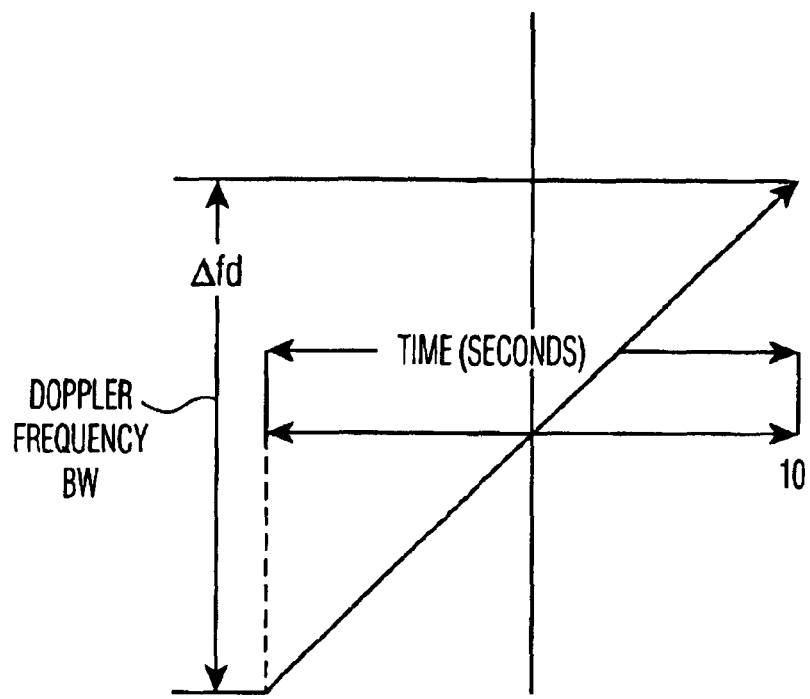
FIG. 7 is a graphical representation of the Doppler frequency variation as a function of time for the received radar signal, shown in FIG. 5, in accordance with an embodiment of the invention.
Figure 8:
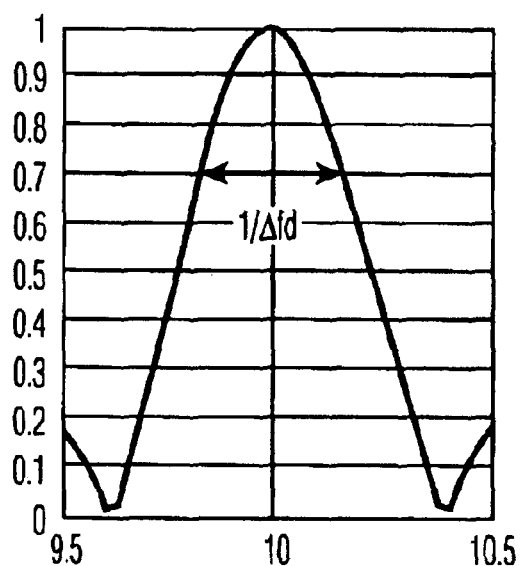
FIG. 8 is a graphical representation of an expanded main lobe of the Doppler frequency signal autocorrelation function for the received radar signal, shown in FIG. 5, in accordance with an embodiment of the invention.

The autocorrelation function of this output signal, at the divided frequency (fd/10), is shown in FIG. 6. The Doppler frequency as a function of time (10 sec.) is shown in FIG. 7. The expanded main lobe of the Doppler frequency is signal autocorrelation function is shown in FIG. 8. As shown, the 3 dB power points of the main lobe are separated in time by $1/\Delta fd$.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method of determining range from a moving platform to an emitter comprising the steps of:
   (a) receiving a RF signal from the emitter;
   (b) counting a number of phase reversals of the received RF signal during a period of time;
   (c) measuring a Doppler frequency during the period of time; and
   (d) determining the range to the emitter based on both the number of phase reversals counted in step (b) and the Doppler frequency measured in step (c).

2. The method of claim 1 wherein
   step (b) includes counting the number of phase reversals of the received RF signal during the period of time the moving platform traverses a distance.

3. The method of claim 2 further including the step of:
   (e) measuring the distance traversed by the moving platform during the period of time; and
   step (d) includes determining the range to the emitter based on the number of phase reversals counted in step (b), the Doppler frequency measured in step (c) and the distance measured in step (e).

4. The method of claim 3 wherein
   measuring the distance includes obtaining geographic position data at each end of the distance traversed by the moving platform, using one of an inertial navigation system (INS), a Global Positioning System (GPS), and a combination of an INS and GPS.

5. The method of claim 3 wherein step (d) includes
   forming a first triangle having (i) a first side being a function of the distance traversed by the moving platform, (ii) a second side being a function of the counted number of phase reversals of the received RF signal, and (iii) a third side being a function of a Law of Cosines, in which an angle $\alpha$ between the first side and the second side is a function of the measured Doppler frequency, and
   determining the range to the emitter using the formed first triangle.

6. The method of claim 5 wherein step (d) includes forming an equilateral triangle in which (i) a base of the equilateral triangle is the third side of the first triangle, and (ii) two equal sides of the equilateral triangle, each side denoted by R, are a function of the angle α, and determining the range to the emitter includes combining a side R of the equilateral triangle and the second side of the first triangle.

7. The method of claim 3 wherein measuring the distance includes measuring the distance during a predetermined period of time having a value ranging between 1 second and 20 seconds.

8. The method of claim 3 wherein step (c) of measuring the Doppler frequency includes measuring variations in the Doppler frequency during the period of time, the variations denoted by Δfd, in which 1/Δfd is approximately a width between 3 dB power points of a main lobe of an autocorrelation function of the Doppler frequency.

9. The method of claim 2 wherein receiving the RF signal includes receiving one of a pulsed Doppler signal and a CW signal.

10. The method of claim 2 further including the steps of:

(e) mixing the received RF signal with an oscillator signal to produce an intermediate frequency (IF) signal;

(f) converting the IF signal into a digital signal;

(g) storing the digital signal in a memory; and (h) providing the digital signal for counting the number of phase reversals in step (b).

11. The method of claim 10 wherein step (e) includes mixing the received RF signal with a numerically controlled oscillator (NCO) signal to produce a phase coherent IF signal.

12. A method of determining range from a moving platform to an emitter comprising the steps of:

(a) receiving a RF signal from the emitter during a period of time the moving platform traverses a distance, the distance denoted by b;

(b) determining a carrier wavelength, λ, of the RF signal;

(c) counting a number of phase reversals of the received RF signal during the period of time, the number denoted by N;

(d) determining a range differential, ΔR, between the moving platform and the emitter during the period of time, in which $$\Delta R = N\lambda;$$

(e) measuring a Doppler frequency, fd, during the period of time; and (f) determining the range to the emitter based on the distance b, the range differential ΔR and the Doppler frequency fd.

13. The method of claim 12 wherein determining the range to the emitter includes calculating an angle α using the following expression:

$$fd = v^* \cos \alpha ^*1/\lambda$$

wherein v is a velocity vector of the moving platform transversing the distance b, α is an angle formed between the velocity vector v and the range differential ΔR.

14. The method of claim 13 wherein determining the range to the emitter includes forming a first triangle having (i) a first side being the distance b, (ii) a second side being Nλ, and (iii) a third side, d, computed by using a Law of Cosines including the first side, the angle α and the second side.

15. The method of claim 14 wherein determining the range to the emitter includes forming an equilateral triangle in which (i) a base of the equilateral triangle is d and (ii) two equal sides of the equilateral triangle, each denoted by R, are a function of the angle α and the base d, and determining the range to the emitter includes combining R and Nλ.

16. An apparatus, installed onboard a moving platform, for determining range from the moving platform to an emitter comprising a receiver for receiving a RF signal from the emitter, an analog to digital converter (ADC) for converting the received RF signal into a digital signal, a memory for storing the digital signal provided by the ADC, and a processor coupled to the memory for extracting the stored digital signal, and (a) counting a number of phase reversals of the digital signal during a period of time, (b) measuring a Doppler frequency during the period of time, and (c) determining the range to the emitter using both the counted number of phase reversals and the measured Doppler frequency.

17. The apparatus of claim 16 including a GPS receiver coupled to the processor for obtaining geographic position of the moving platform, and the processor determining a distance traversed by the moving platform during the period of time based on the geographic position obtained from the GPS receiver.

18. The apparatus of claim 16 including a mixer coupled between the receiver and the ADC for converting the received RF signal into an IF signal, wherein the ADC converts the IF signal into the digital signal.

19. The apparatus of claim 18 wherein the mixer is coupled to a NCO for providing a coherent signal to the mixer, and the mixer combines the received RF signal and the coherent signal to provide the IF signal.

20. The apparatus of claim 16 wherein the processor measures a plurality of Doppler frequencies during the time period, and the processor includes an autocorrelation function for autocorrelating the plurality of Doppler frequencies measured during the time period and obtaining an averaged Doppler frequency based on results of the autocorrelation function.

* * * * *